United States Patent
Lin et al.

(10) Patent No.: US 8,712,150 B2
(45) Date of Patent: Apr. 29, 2014

(54) DEVICE AND METHOD FOR ADJUSTING A CHROMINANCE SIGNAL BASED ON AN EDGE STRENGTH

(75) Inventors: Teng-Yi Lin, Kaohsiung County (TW); Mei-Fei Chen, Hsinchu (TW)

(73) Assignee: Novatek Microelectronics Corp., Hsinchu (TW)

(*) Notice: Subject to any disclaimer, the term of this patent is extended or adjusted under 35 U.S.C. 154(b) by 1098 days.

(21) Appl. No.: 12/711,266

(22) Filed: Feb. 24, 2010

(65) Prior Publication Data

US 2011/0052048 A1 Mar. 3, 2011

(30) Foreign Application Priority Data

Sep. 1, 2009 (TW) ................................ 98129452 A (51) Int. Cl.
G06K 9/00 (2006.01)
(52) U.S. Cl.
USPC .......................... 382/167; 382/162; 382/165
(58) Field of Classification Search
USPC ....................................................... 382/167
See application file for complete search history.

(56) References Cited

U.S. PATENT DOCUMENTS

| | | | | |
|---|---|---|---|---|
| 4,819,061 A * | 4/1989 | Lang | ............................... | 348/666 |
| 5,450,216 A * | 9/1995 | Kasson | ......................... | 358/518 |
| 5,729,360 A * | 3/1998 | Kita et al. | ..................... | 358/500 |
| 6,408,103 B1 * | 6/2002 | Gallagher et al. | ............. | 382/260 |
| 6,600,517 B1 * | 7/2003 | He et al. | ......................... | 348/625 |
| 6,804,392 B1 * | 10/2004 | Adams et al. | ................. | 382/167 |
| 7,319,496 B2 * | 1/2008 | Uchida et al. | ................. | 348/625 |
| 7,738,044 B2 * | 6/2010 | Arici et al. | ..................... | 348/631 |
| 7,889,279 B2 * | 2/2011 | Chen | .............................. | 348/631 |
| 8,149,293 B2 * | 4/2012 | Utsugi | ........................ | 348/223.1 |
| 8,150,154 B2 * | 4/2012 | Kang et al. | ..................... | 382/167 |
| 8,259,235 B2 * | 9/2012 | Chen et al. | ..................... | 348/631 |
| 8,330,871 B2 * | 12/2012 | Lin et al. | ........................ | 348/702 |
| 2004/0071363 A1 * | 4/2004 | Kouri et al. | ..................... | 382/276 |
| 2005/0025383 A1 * | 2/2005 | Domingo et al. | ............. | 382/266 |
| 2005/0168644 A1 * | 8/2005 | Demas et al. | ................. | 348/630 |

(Continued)

FOREIGN PATENT DOCUMENTS

| | | |
|---|---|---|
| TW | 200825987 | 6/2008 |
| TW | 200931949 | 7/2009 |

OTHER PUBLICATIONS

Fan, Jianping et al, "Automatic Image Segmentation by Integrating Color-Edge Extraction and Seeded Region Growing", 2001, IEEE Transactions on Image Processing, vol. 10 No. 10, p. 1454-1466.*

(Continued)

*Primary Examiner* — Gandhi Thirugnanam
(74) *Attorney, Agent, or Firm* — Jianq Chyun IP Office (57) ABSTRACT

An image color processing device adapted to process a luminance data and an input chrominance data of an image includes an edge detecting unit, a chrominance filtering unit, and a chrominance mixing unit. The edge detecting unit receives the luminance data and detects whether each pixel of the image is on an edge of an image object and correspondingly assigns an edge strength to each pixel. The chrominance filtering unit receives the input chrominance data and then outputs a filtered chrominance data. The chrominance mixing unit receives the edge strength, the filtered chrominance data and the input chrominance data, and mixes the filtered chrominance data and the input chrominance data by a weighting manner, according to the edge strength, so as to obtain an output chrominance data.

13 Claims, 5 Drawing Sheets

(56) References Cited

U.S. PATENT DOCUMENTS

| | | | |
|---|---|---|---|
| 2005/0207641 A1* | 9/2005 | Bala et al. | 382/162 |
| 2005/0232481 A1* | 10/2005 | Wu | 382/167 |
| 2007/0040944 A1* | 2/2007 | Hong | 348/624 |
| 2007/0171310 A1* | 7/2007 | Arici et al. | 348/687 |
| 2007/0216813 A1* | 9/2007 | Arici et al. | 348/630 |
| 2007/0268410 A1* | 11/2007 | Chen | 348/624 |
| 2008/0012968 A1* | 1/2008 | Lim et al. | 348/252 |
| 2008/0024670 A1* | 1/2008 | Chen et al. | 348/624 |
| 2008/0181491 A1* | 7/2008 | Bala et al. | 382/162 |
| 2008/0181495 A1* | 7/2008 | Spampinato et al. | 382/167 |
| 2008/0317373 A1* | 12/2008 | Aoyama et al. | 382/269 |
| 2010/0027886 A1* | 2/2010 | Kang et al. | 382/167 |
| 2010/0066874 A1* | 3/2010 | Ishiga | 348/252 |
| 2010/0177962 A1* | 7/2010 | Kalman | 382/167 |
| 2011/0001880 A1* | 1/2011 | Chen et al. | 348/631 |
| 2011/0052048 A1* | 3/2011 | Lin et al. | 382/165 |

OTHER PUBLICATIONS

"Office Action of Taiwan Counterpart Application", issued on Aug. 22, 2013, p1-p7, in which the listed references were cited.

* cited by examiner

DEVICE AND METHOD FOR ADJUSTING A CHROMINANCE SIGNAL BASED ON AN EDGE STRENGTH

CROSS-REFERENCE TO RELATED APPLICATION

This application claims the priority benefit of Taiwan application serial no. 98129452, filed on Sep. 1, 2009. The entirety of the above-mentioned patent application is hereby incorporated by reference herein and made a part of specification.

BACKGROUND OF THE INVENTION

1. Field of the Invention

The invention relates to an image processing technique, and more particularly, to an image color processing technique.

2. Description of Related Art

In a variety of image devices, the quality of the chrominance signal is usually poor due to a variety of factors such as storing or transmitting, resulting in affecting the overall quality of the image. More particularly, the color quality of the edge of an object of the image may affect the clearness of the object displayed.

Figure 1:
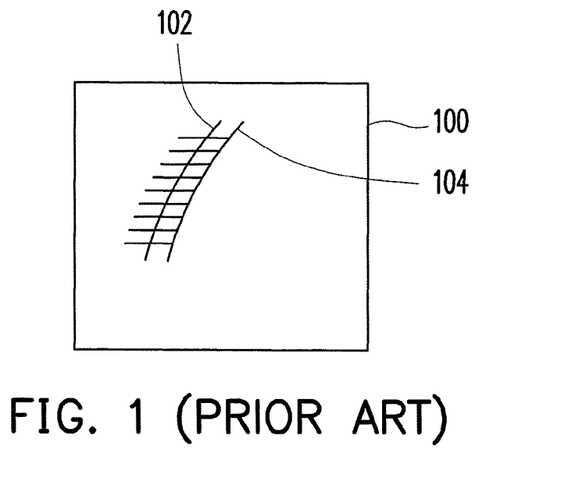
FIG. 1 illustrates a schematic view of a condition occurring in displaying the edge of an object according to a conventional image processing technique.

FIG. 1 illustrates a schematic view of a condition occurring in displaying the edge of an object according to a conventional image processing technique. Please refer to FIG. 1. To an image 100 displayed in an image display system, the displayed object image generally has an actual edge 102 of an object. In some conditions, the actual edge 102 of the object often has a displayed edge 104 with rainbows, causing the edge of the object blurred and then affecting the display quality. Here, the edge of the object, as known by the ordinary people, refers to the image content having textures in the displayed image. For example, the object to be displayed is a spherical object and the edge of the spherical object may have the circular texture formed with wildly changing in colors. The NTSC format is the most obvious of the above conditions of the poor quality of displaying edges. The data stored in the NTSC format is:

$$N = Y + Cb \cos(\Omega t) + Cr \sin(\Omega t),$$

wherein Y is the luminance data, and the chrominance data (CbCr) is the color information in the YUV color space. The NTSC format is to form composite data from YCbCr. The separations of Y and CbCr are required to obtain the luminance and the chrominance of the image but result in the loss of the chrominance data.

Figure 2:
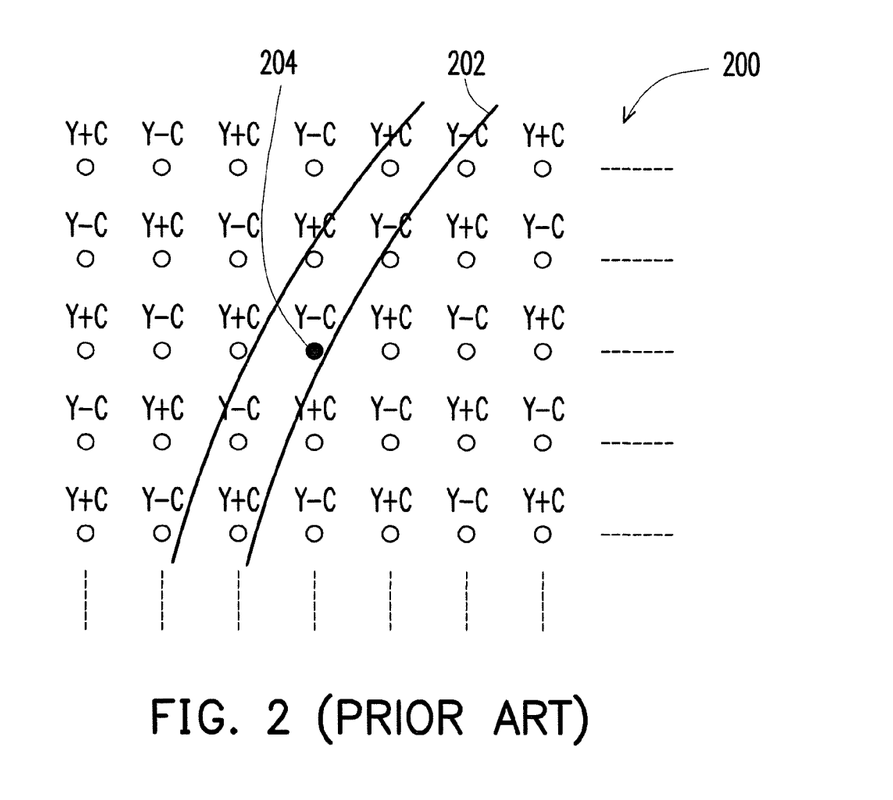
FIG. 2 illustrates a schematic view of a conventional processing chrominance data method.

FIG. 2 illustrates a schematic view of a conventional processing chrominance data method. Please refer to FIG. 2. The digital image 200 is the image data displaying the corresponding pixels of an image in the YUV color space with a pixel array. The adjacent pixel data of the odd image frame of the digital image 200 is stored in Y+C and Y−C alternatively. The next even image frame stores data in Y−C and Y+C alternatively. After the two adjacent images are mutually added or subtracted, the data of Y and C may be separated off. However, taking the pixel 204 of the object edge 202 as an example, the data of separated Y' and C' are both mixed with the data of C and Y because the object edge 202 usually has significant changes in luminance and chrominance. In other words, the separated Y' and C' have the errors as follows:

$$Y' = Y + \Delta C;$$

$$C' = C + \Delta Y.$$

Therefore, the displaying of the edge of the object results in poor quality.

Additionally, when the pixels are displayed in the RGB format, the arrangement of RGB subpixels generally adopts the most highly dense method to combine pixels. Therefore, the number of the green subpixels may be more than the number of the red subpixels and the number of the blue subpixels, and then the color of the image may be greenish. Hence, the displaying method in RGB may also result in distortion on the edge of the object.

How to improve the quality of the chrominance signal is one of the considerable factors of image processing.

SUMMARY OF THE INVENTION

The invention provides an image color processing device and method thereof to at least improve the quality of the chrominance signal so as to make the edge of a displayed object have better displaying quality.

The invention provides an image color processing device adapted to process a luminance data and a chrominance data of an image. The image color processing device includes an edge detecting unit receiving the luminance data of the image, detecting whether each pixel of the image is on an object edge, and correspondingly assigning an edge strength to each of the pixels. A chrominance filtering unit receives the input chrominance data of the image to output a filtered chrominance data after performing a chrominance filtering. A chrominance mixing unit receives the edge strength, the filtered chrominance data, and the input chrominance data to mix the filtered chrominance data and the input chrominance data by a weighting manner according to the edge strength to obtain an output chrominance data.

According to one embodiment of the invention, the edge detecting unit of the image color processing unit includes, for example, a horizontal edge detecting unit adapted to determine a horizontal edge strength for each of the pixels, and a vertical edge detecting unit adapted to determine a vertical edge strength for each of the pixels, wherein the edge strength is obtained according to a calculation with the horizontal edge strength and the vertical edge strength.

According to one embodiment of the invention, for example, each of the horizontal edge detecting unit and the vertical edge detecting unit of the image color processing device comprises a [−1, 2, −1]/4 filter respectively to filter the luminance data of the image to obtain a potential edge zone.

According to one embodiment of the invention, for example, the chrominance filtering unit of the image color processing device includes a sorting unit and a selection unit. The sorting unit receives the input chrominance data and taking N successive input chrominance data prior to a pixel to be processed to sort the N successive input chrominance data as N sorted chrominance data in numerical order. The selection unit takes the Mth largest chrominance data from the N sorted chrominance data as the filtered chrominance data of the pixel after filtering, wherein M is larger than 1, and N is larger than M.

According to one embodiment of the invention, for example, the chrominance mixing unit of the image color processing device includes a weighting unit and a mixing unit. The weighting unit receives the edge strength to generate a weighting value, wherein the weighting value is set to 0 when the edge strength is smaller than a low threshold value, the weighting value is set to 1 when the edge strength is larger than a high threshold value. When the edge strength falls within the range from the low threshold value to the high threshold value the weighting value is set according to the linear ratio of the edge strength. The mixing unit receives the weighting value, the filtered chrominance data, and the input chrominance data to mix the filtered chrominance data and the input chrominance data linearly according to the weighting value to obtain the output chrominance data.

The invention further provides an image color processing method adapted to process a luminance data and a chrominance data of an image. The image color processing method includes performing an edge detecting step to receive the luminance data of the image, detect whether each pixel of the image is on an object edge, and correspondingly assign an edge strength to each of the pixels. In addition, the image color processing method further includes performing the chrominance filtering step to receive the input chrominance data of the image, perform the chrominance filtering, and output a filtered chrominance data. The chrominance mixing step includes receiving the edge strength, the filtered chrominance data, and the input chrominance data to mix the filtered chrominance data and the input chrominance data by a weighting manner according to the edge strength to obtain an output chrominance data.

The invention also provides an image color processing method adapted to a display system to process a luminance data and an input chrominance data of an image. The image color processing method includes receiving a luminance data and an input chrominance data of the image. Next, whether a pixel to be displayed is on an edge zone of an image object is detected and then an edge strength is assigned to the pixel. A filtering process is performed on the input chrominance data to obtain a filtered chrominance data. The input chrominance data and the filtered chrominance data are mixed with weight according to the edge strength, so as to obtain a new chrominance data.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The invention is directed to further performing a filtering process of object edge on the separated luminance data Y and the separated chrominance data C, so as to at least enhance filtering the chrominance data at the object edge. The invention is illustrated through the following embodiments, but not limited to the embodiments elaborated hereinafter. Also, the provided embodiments may be properly combined with each other to obtain other embodiments.

Figure 3:
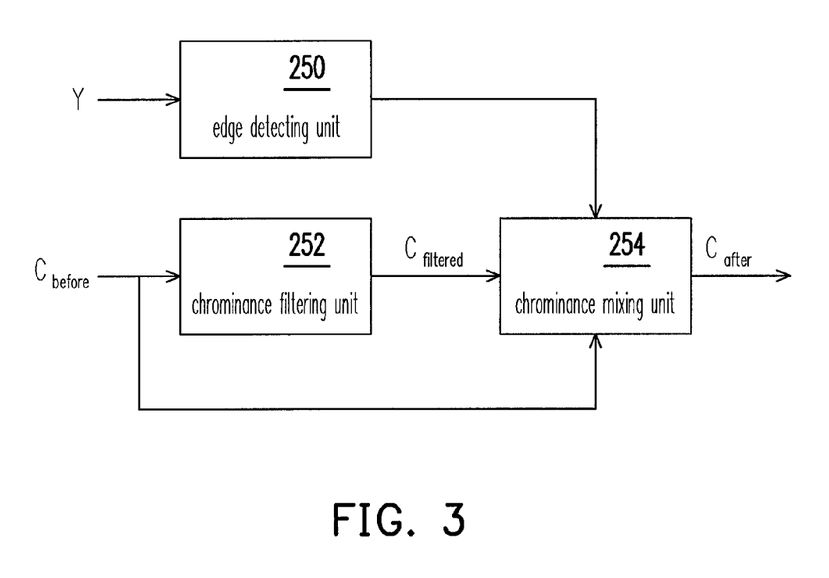
FIG. 3 illustrates a schematic view of a circuit block diagram of an image color processing device according to one embodiment of the invention.

Since an object edge to be displayed may lose more chrominance data, the invention first detects whether a pixel to be displayed is on the zone of the object edge. According to the detected strength of the object edge, the chrominance data may be performed a filtering process on, such as the filtering process for high chrominance components on the edge. Afterwards, the filtered chrominance data and the original chrominance data are mixed with weighting according to the detected edge strength to obtain new chrominance data. FIG. 3 illustrates a schematic view of a circuit block diagram of an image color processing device according to one embodiment of the invention. Please refer to FIG. 3. An edge detecting unit 250 receives luminance data Y of pixels of a frame or at least a portion of the pixels, and performs an edge detection. The detailed mechanism of the edge detection is described hereafter. The edge detecting unit 250 correspondingly generates an edge strength value after detecting for each of the pixels.

The chrominance filtering unit 252 receives a chrominance data $C_{before}$ inputted by the corresponding pixel and separated in advance. After the chrominance filtering unit 252 filters the chrominance data $C_{before}$, the exceeding chrominance value generated on the object edge in the process of separating chrominance for the object edge is reduced, so as to obtain a filtered chrominance data $C_{filtered}$ and output the filtered chrominance data $C_{filtered}$ to the subsequent chrominance mixing unit 254. The embodiments for more detailed mechanism of filtering chrominance data will be described in FIG. 5 later.

The chrominance mixing unit 254 receives the edge strength outputted from the edge detecting unit 250, the filtered chrominance data $C_{filtered}$ outputted from the chrominance filtering unit 252, and the input chrominance data $C_{before}$. The input chrominance data and the filtered chrominance data are mixed by a weighting manner according to the edge strength to obtain an output chrominance data $C_{after}$. In other words, the output chrominance data $C_{after}$ after mixing is adjusted according to whether the displayed content is on the edge of the object. Therefore, the quality of chrominance is improved.

Then, the embodiments in designs for the functions of the edge detecting unit 250, the chrominance filtering unit 252, and the chrominance mixing unit 254 are described respectively hereafter.

Figure 4:
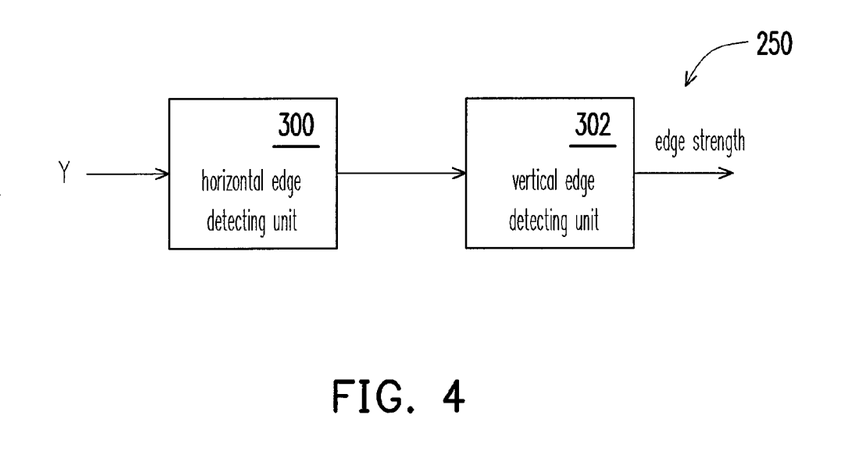
FIG. 4 illustrates a schematic view of a circuit block diagram of an edge detecting unit according to one embodiment of the invention.

The edge detecting unit 250 may be any of ordinary mechanisms capable of detecting the edge of an object, and not specific. However, one embodiment of a simple edge detecting unit accompanied with the operation of FIG. 3 is provided according to the invention. FIG. 4 illustrates a schematic view of a circuit block diagram of an edge detecting unit according to one embodiment of the invention. Please refer to FIG. 4. The edge detecting unit 250 comprises a horizontal edge detecting unit 300 and a vertical edge detecting unit 302, for example. The horizontal edge detecting unit 300 and the vertical edge detecting unit 302 are connected such as in series. The horizontal edge detecting unit 300 and the vertical edge detecting unit 302 detect the edge strengths that could belong to the object edge in horizontal direction and vertical direction respectively. Therefore, for example, the simple detecting method is achieved without the further consideration of the actual extending direction of the object edge. However, more detailed edge detecting mechanisms or other mechanisms may also be adopted.

Figure 8:
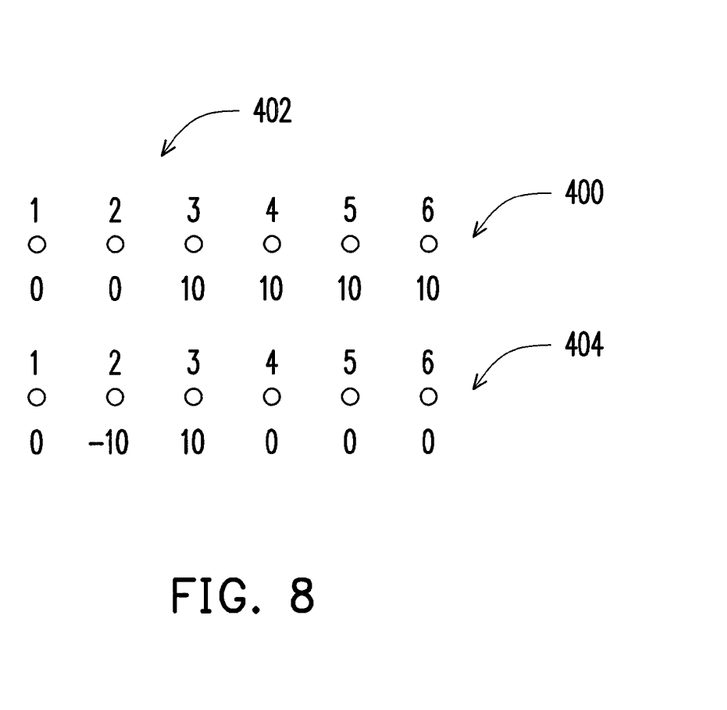
FIG. 8 illustrates a schematic view of an edge detecting mechanism according to one embodiment of the invention.

As to the edge detecting mechanism, please refer to FIG. 8. FIG. 8 illustrates a schematic view of an edge detecting mechanism according to one embodiment of the invention. The luminance data Y of the object edge have more obvious changes. Taking a portion of pixel data of a horizontal scan line as an example for illustrating, the mechanism thereof could also be applied to the edge detection on the vertical lines. To the luminance data Y for each of the six pixels 1-6 in a horizontal scan line 400, for example, each Y value of pixels 1-2 is 0, and each Y value of pixels 3-6 is 10. The change from 0 to 10 means that an edge of the object exits around the pixel 3. When the horizontal detecting unit 300 adopts a filter such as [−1, 2, −1], wherein [−1, 2, −1] directs to the multiplying factors of the luminance Y of the three adjacent pixels and could be further divided by a normalization factor such as 4. After calculating through the [−1, 2, −1] filter, a new horizontal scan line 404 just with the information of the edge effect is obtained. For example, the object edge 402 comprises the pixel 2 and the pixel 3. The filtering calculation of the pixel 2 is, for example, taking the three adjacent pixels 1~3 corresponding to the pixel 2 to perform the calculation of the filter:

(−1)*0+(2)*0+(−1)*10=−10.

Also, to the pixel 3, the calculation of the filter is (−1)*0+(2)*10+(−1)*10=10.

The result of each of the other pixels after the calculation of the filter is 0. Therefore, the values of the pixels of a zone that could be the edge have significant changes in pixel value. According the same method thereon, the vertical edge detecting unit 302 also adopts a filter such as the [−1, 2, −1] filter but filters the luminance data corresponding to the vertical direction. The filter is, for example, $$\begin{bmatrix} -1 \\ 2 \\ -1 \end{bmatrix} / 4.$$

The filtered luminance data Y may determine the edge strengths in horizontal direction and in vertical direction respectively according to the values of the filtered luminance data Y, and the edge strengths in the two directions may be combined to form a single strength, for example. The decision mechanism may be processed according to a selected ordinary processing rule, not be restricted to a specific method.

Figure 5:
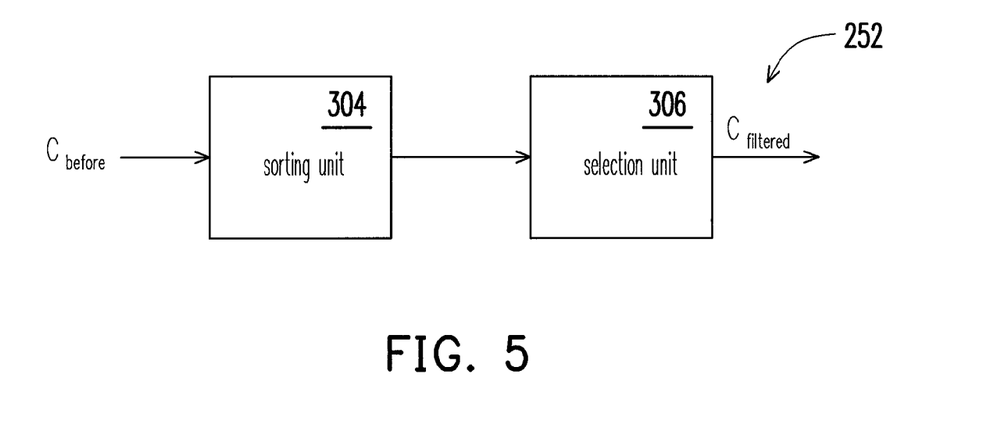
FIG. 5 illustrates a schematic view of a circuit block diagram of a chrominance filtering unit according to one embodiment of the invention.

Next, the chrominance filtering unit 252 is described below. FIG. 5 illustrates a schematic view of a circuit block diagram of a chrominance filtering unit according to one embodiment of the invention. Please refer to FIG. 5. The internal circuit structure of the chrominance filtering unit 252 comprises, for example, an N-point sorting unit 304 and a selection unit 306. The sorting unit 304 receives the input chrominance data $C_{before}$ and takes N successive input chrominance data prior to a pixel to be processed to sort the N successive input chrominance data as N sorted chrominance data in numerical order. The selection unit 306 takes the $M^{th}$ largest chrominance data from the N sorted chrominance data as the filtered chrominance data $C_{filtered}$ of the pixel after filtering, wherein M is larger than 1, and N is larger than M. Moreover, for example, N is 4 or 5, and M is 2 or 3. In other words, after sorting, the maximum chrominance value is replaced with the smaller $M^{th}$ chrominance value.

Figure 9:
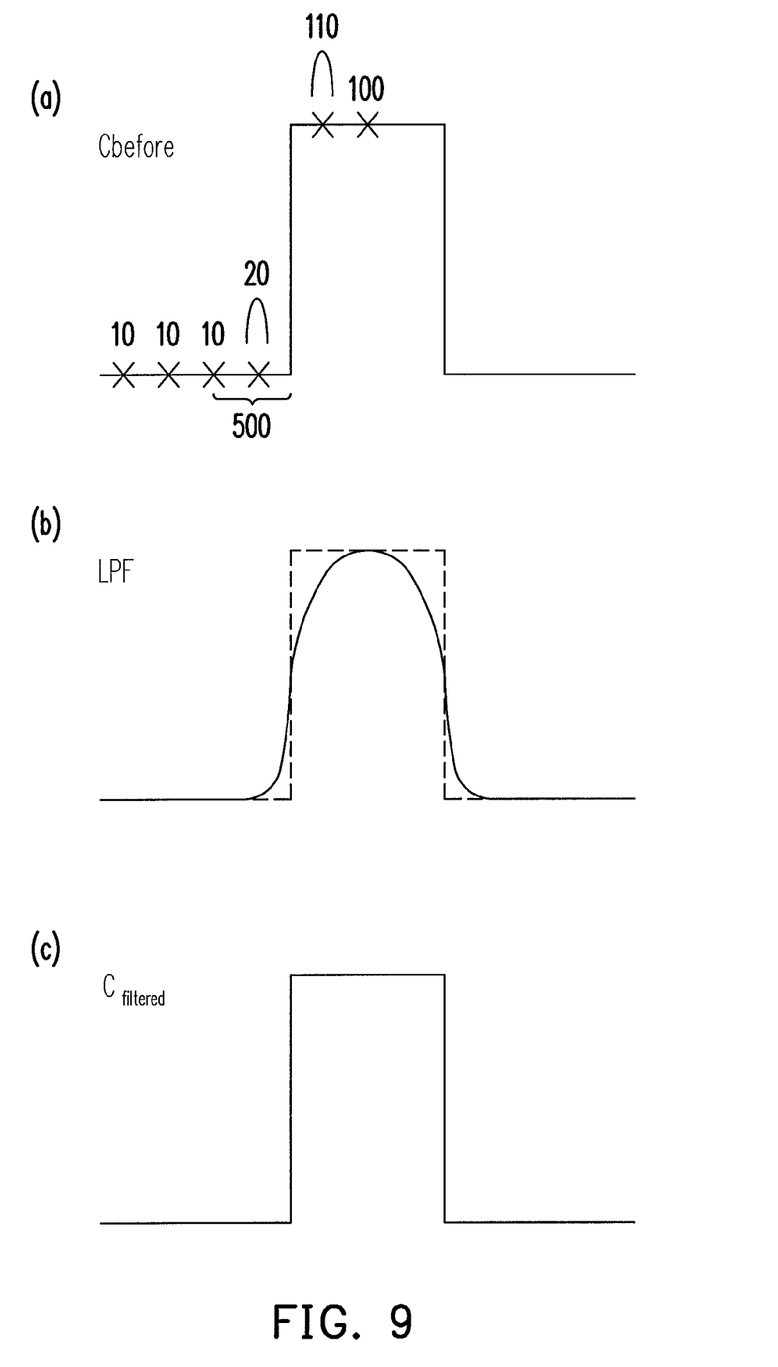
FIG. 9 illustrates a schematic view of an edge detecting mechanism according to one embodiment of the invention.

FIG. 9 illustrates a schematic view of an edge detecting mechanism according to one embodiment of the invention. Please refer to FIG. 9. Usually, the chrominance values in separation may generate excessive changes on object edges, hence the separated chrominance values differ far from the actual chrominance.

In FIG. 9(a), for example, the pixels before and after the edge zone 500 as illustrated may have excessive chrominance values. For example, the pixel values of the two sides of the edge are 20 and 110 respectively, and are larger than the normal values 10 and 100 respectively. When the ordinary low pass filter (LPF) as shown in FIG. 9(b) is adopted, the edge may be blurred so as to make the edge unobvious.

As shown in FIG. 9(c), when the method in FIG. 5 is taken, since the maximum chrominance value does not take the original input chrominance data directly but is replaced by the smaller $M^{th}$ chrominance value, the chrominance value of the edge may be close to the actual chrominance value of the edge. Therefore, the filtered chrominance data $C_{filtered}$ is obtained.

Figure 6:
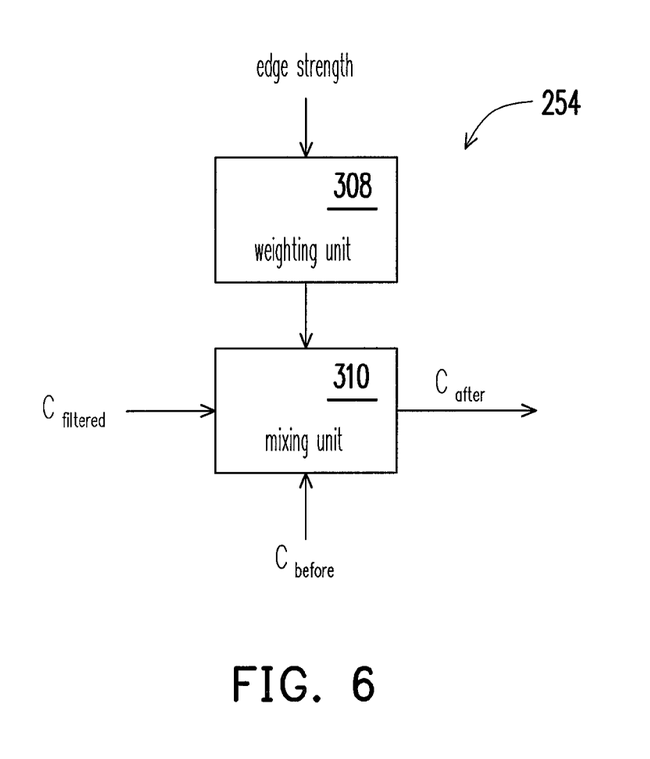
FIG. 6 illustrates a schematic view of a circuit block diagram of a chrominance mixing unit according to one embodiment of the invention.
Figure 7:
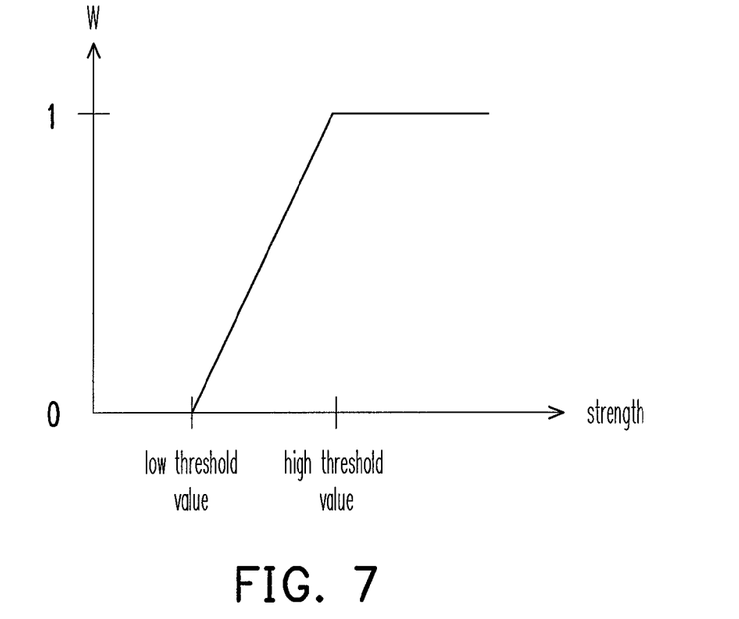
FIG. 7 illustrates a schematic view of generating weighting value in the weighting unit 308 according to one embodiment of the invention.

Next, the chrominance mixing unit 254 is described below. FIG. 6 illustrates a schematic view of a circuit block diagram of a chrominance mixing unit according to one embodiment of the invention. Please refer to FIG. 6. The chrominance mixing unit 254 includes a weighting unit 308 and a mixing unit 310. The weighting unit 308 receives the edge strength outputted from the edge detecting unit 250 to generate a weighting value. FIG. 7 illustrates a schematic view of generating weighting value in weighting unit 308 according to one embodiment of the invention. Please refer to FIG. 7. The method for the weighting unit 308 to generate the weighting value W is, for example, setting the weighting value W to 0 when the edge strength is smaller than a low threshold value. The weighting value set to 0 means that the image to be processed is not on the zone of the object edge. When the edge strength is larger than a high threshold value, the weighting value is set to 1 to mean that the image to be processed is on the zone of the object edge. When the edge strength falls within the range from the high threshold value to the low threshold value, the weighting value is set according to, for example, the linear relationship.

The weighting value W determined by the weighting unit 308 is outputted to the mixing unit 310. The mixing unit 310 receives three input signals including the weighting value W, the filtered chrominance data $C_{filtered}$, and the input chrominance data $C_{before}$. According to the investigation of the invention, the chrominance data on the zone of the edge may have larger changes, while the chrominance data on the other zones may have smaller changes. After the weighting unit 308 determines two end values by the weighting values, the other weighting value W obtained by the linear interpolation reflects the relationship between the chrominance data and the zone of the edge. The mixing unit 310, for example, mixes the filtered chrominance data $C_{filtered}$ and the input chrominance data $C_{before}$ according to the weighting value W to obtain the mixed chrominance data $C_{after}$ to be outputted. The relationship is, for example, $$C_{after} = C_{filtered} * W + (1-W) * C_{before}.$$

Since the edge of the object is the primary part to be displayed in the image, the shape of the object is presented by the improvement in colors. The invention is directed to performing an edge strength analysis according to the luminance of the edge of the object. In addition, the high frequency component of the chrominance is filtered out so as to make the chrominance data more close to the actual chrominance. Afterwards, the filtered chrominance data and the originally inputted chrominance data are mixed according to the edge strength so as to obtain the processed chrominance data, wherein a manner for mixing is, for example, mixing by a weighting manner according to the linear ratio, but not limited to the linear ratio.

Since the implementing method of the hardware circuit may have different designs, the mentioned processing circuit devices are not limited herein. From the aspect of the processing method, according to the same concept thereon, the invention also provides an image color processing method including performing the edge detecting step, receiving the chrominance data of the image, detecting whether each pixel of the image is on the object edge and correspondingly assigning an edge strength to each of the pixels. In addition, the image color processing method further includes performing the chrominance filtering step to receive the input chrominance data of the image, perform the chrominance filtering, and output the filtered chrominance data. The chrominance mixing step includes receiving three information, including the edge strength, the filtered chrominance data, and the input chrominance data. The input chrominance data and the filtered chrominance data are mixed by a weighting manner according to the edge strength to obtain an output chrominance data.

In more general, the invention also provides an image color processing method adapted to a display system to process a luminance data and an input chrominance data of an image and receive a luminance data and an input chrominance data of the image. Next, the method detects whether a pixel to be displayed is on an edge zone of a image object and then assigns an edge strength to the pixel. A filtering process is performed on the input chrominance data to obtain a filtered chrominance data. The input chrominance data and the filtered chrominance data are performed a weighted mixing according to the edge strength to obtain a new chrominance data.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An image color processing device adapted to process a luminance data and an input chrominance data of an image, the image color processing device comprising:
    an edge detecting unit to receive the luminance data of the image to detect whether each pixel of the image is on an edge of an image object and correspondingly assign an edge strength to each of the pixels;
    a chrominance filtering unit to receive the input chrominance data of the image to output a filtered chrominance data after performing a chrominance filtering, wherein the chrominance filtering unit comprises:
    a sorting unit receiving the input chrominance data and taking prior N successive input chrominance data counting from the pixel to be processed to sort the N successive input chrominance data as N sorted chrominance data in numerical order; and
    a selection unit taking the $M^{th}$ largest chrominance data from the N sorted chrominance data as the filtered chrominance data of the pixel after filtering, wherein M is larger than 1, and N is larger than M; and
    a chrominance mixing unit configured to receive the edge strength, the filtered chrominance data, and the input chrominance data to mix the filtered chrominance data and the input chrominance data by a weighting manner according to the edge strength to obtain an output chrominance data.

2. The image color processing device as claimed in claim 1, wherein the edge detecting unit comprises:
    a horizontal edge detecting unit adapted to determine a horizontal edge strength of each of the pixels; and
    a vertical edge detecting unit adapted to determine a vertical edge strength of each of the pixels,
    wherein the edge strength is obtained according to a calculation with the horizontal edge strength and the vertical edge strength.

3. The image color processing device as claimed in claim 2, wherein each of the horizontal edge detecting unit and the vertical edge detecting unit comprises a filter of $[-1, 2, -1]/4$ respectively to filter the luminance data of the image to obtain a potential edge zone.

4. The image color processing device as claimed in claim 1, wherein N is 4 or 5, and M is 2 or 3.

5. The image color processing device as claimed in claim 1, wherein the chrominance mixing unit comprises:
    a weighting unit receiving the edge strength to generate a weighting value, wherein the weighting value is set to 0 when the edge strength is smaller than a low threshold value, the weighting value is set to 1 when the edge strength is larger than a high threshold value, and the weighting value is set according to the linear ratio between 0 and 1 when the edge strength falls within the range from the low threshold value to the high threshold value; and
    a mixing unit receiving the weighting value, the filtered chrominance data, and the input chrominance data to mix the filtered chrominance data and the input chrominance data linearly according to the weighting value to obtain the output chrominance data.

6. The image color processing device as claimed in claim 5, wherein when the weighting value is represented by W, the filtered chrominance data is represented by Cf, the input chrominance data is represented by Cb, and the output chrominance data is represented by Ca,
    the output chrominance data is expressed by $Ca=Cf*W+(1-W)*Cb$.

7. An image color processing method adapted to process a luminance data and an input chrominance data of an image, the image color processing method comprising:
    performing an edge detecting step to receive the luminance data of the image to detect whether each pixel of the image is on an edge of an image object and correspondingly assign an edge strength to each of the pixels;
    performing a chrominance filtering step to receive the input chrominance data of the image and perform a chrominance filtering to output a filtered chrominance data, wherein the chrominance filtering step comprises:
        performing a sorting step to receive the input chrominance data and take N successive input chrominance data prior from the pixel to be processed to sort the N successive input chrominance data as N sorted chrominance data in numerical order; and
        performing a selection step to take the $M^{th}$ largest chrominance data from the N sorted chrominance data as the filtered chrominance data of the pixel after filtering, wherein M is larger than 1, and N is larger than M; and performing a chrominance mixing step to receive the edge strength, the filtered chrominance data, and the input chrominance data to mix the filtered chrominance data and the input chrominance data by a weighting manner according to the edge strength to obtain an output chrominance data.

8. The image color processing method as claimed in claim 7, wherein the edge detecting step comprises:
   detecting horizontal edges to determine a horizontal edge strength of each of the pixels;
   detecting vertical edges to determine a vertical edge strength of each of the pixels; and
   obtaining the edge strength according to a calculation with the horizontal edge strength and the vertical edge strength.

9. The image color processing method as claimed in claim 8, wherein each of the detecting horizontal edges step and the detecting the vertical edges step adopts a [−1, 2, −1]/4 filtering process respectively to filter the luminance data of the image to obtain a potential edge zone.

10. The image color processing method as claimed in claim 7, wherein N is 4 or 5, and M is 2 or 3.

11. The image color processing method as claimed in claim 7, wherein the chrominance mixing step comprises:
   performing a weighting step to receive the edge strength to generate a weighting value, wherein the weighting value is set to 0 when the edge strength is smaller than a low threshold value, the weighting value is set to 1 when the edge strength is larger than a high threshold value, and the weighting value is set according to the linear ratio between 0 and 1 when the edge strength falls within the range from the low threshold value to the high threshold value; and
   performing a mixing step to receive the weighting value, the filtered chrominance data, and the input chrominance data to mix the filtered chrominance data and the input chrominance data linearly according to the weighting value to obtain the output chrominance data.

12. The image color processing method as claimed in claim 11, wherein when the weighting value is represented by W, the filtered chrominance data is represented by Cf, the input chrominance data is represented by Cb, and the output chrominance data is represented by Ca, the output chrominance data is calculated from $Ca=Cf*W+(1-W)*Cb$.

13. An image color processing method adapted to a display system to process a luminance data and an input chrominance data of an image, the image color processing method comprising:
   receiving the luminance data and the input chrominance data of the image;
   detecting whether a pixel to be displayed is on an edge of an image object and assigning an edge strength to the pixel;
   performing a filtering process on the input chrominance data to obtain a filtered chrominance data; and
   performing a weighted mixing with the input chrominance data and the filtered chrominance data according to the edge strength to obtain a new chrominance data,
   wherein the filtering process comprises:
      performing a sorting step to receive the input chrominance data and take N successive input chrominance data prior from the pixel to be processed to sort the N successive input chrominance data as N sorted chrominance data in numerical order and
      performing a selection step to take the $M^{th}$ largest chrominance data from the N sorted chrominance data as the filtered chrominance data of the pixel after filtering, wherein M is larger than 1, and N is larger than M.

* * * * *